(12) United States Patent
Xu et al.

(10) Patent No.: US 10,093,248 B2
(45) Date of Patent: Oct. 9, 2018

(54) VEHICLE CORD CONNECTION ASSEMBLY AND INTERIOR TRIM ASSEMBLY

(71) Applicant: FORD GLOBAL TECHNOLOGIES, LLC, Dearborn, MI (US)

(72) Inventors: Tom Xu, Nanjing (CN); Leo Chen, Nanjing (CN); Derek Kang, Nanjing (CN); Brick Deng, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 15/154,593

(22) Filed: May 13, 2016

(65) Prior Publication Data
US 2016/0355149 A1 Dec. 8, 2016

(30) Foreign Application Priority Data

Jun. 8, 2015 (CN) .......................... 2015 1 0310274

(51) Int. Cl.
*B60R 16/02* (2006.01)
*B60R 7/04* (2006.01)

(52) U.S. Cl.
CPC ............ *B60R 16/0215* (2013.01); *B60R 7/04* (2013.01)

(58) Field of Classification Search
CPC ............ B60R 11/02; B60R 2011/0028; B60R 2011/0075; B60R 2011/0082; B60R 11/0235; B60R 2011/0017; B60R 2011/0045

USPC ..... 296/24.34, 37.7, 37.8; 297/217.1, 217.3; 710/303

See application file for complete search history.

(56) References Cited

U.S. PATENT DOCUMENTS

| 6,608,399 | B2 | 8/2003 | McConnell et al. | |
| 7,413,229 | B2* | 8/2008 | Kukucka | B60N 3/101 296/24.34 |
| 7,909,397 | B2 | 3/2011 | Shalam et al. | |
| 8,172,293 | B2* | 5/2012 | Lota | B60R 11/02 224/483 |
| 8,624,547 | B2 | 1/2014 | Thorsell et al. | |
| 8,646,825 | B2 | 2/2014 | Minelli et al. | |
| 8,814,243 | B2 | 8/2014 | Kumblekere et al. | |
| 8,953,102 | B2 | 2/2015 | Tranchina et al. | |
| 9,016,752 | B2* | 4/2015 | Myers | B60R 7/06 296/24.34 |
| 2011/0240363 | A1* | 10/2011 | Dinh | H02G 3/088 174/551 |
| 2014/0006669 | A1 | 1/2014 | Klein et al. | |

* cited by examiner

*Primary Examiner* — D Glenn Dayoan
*Assistant Examiner* — Sunsurraye Westbrook
(74) *Attorney, Agent, or Firm* — Vichit Chea; King & Schickli, PLLC

(57) ABSTRACT

A cord connection assembly of a vehicle includes a wall, a door movable to and defining a space from the wall, and a receptacle received within the space and to detachably connect a plug with a cord. At least one of the wall and the door include a through-aperture to receive the cord such that first and second parts of the cord are positioned respectively inside and outside of the space when the plug is connected to the receptacle.

15 Claims, 3 Drawing Sheets

VEHICLE CORD CONNECTION ASSEMBLY AND INTERIOR TRIM ASSEMBLY

TECHNICAL FIELD

This document relates to a cord connection assembly and an interior trim assembly of a vehicle.

BACKGROUND

During vehicle use, various electronics are often purchased and installed to the vehicle. Non-limiting examples of which include a navigation device, an event data recorder, and a head up display (HUD). Therefore, the vehicle may be configured with cords or cables to provide any needed connection.

By way of example, U.S. Pat. No. 8,646,825 B2 discloses an overhead console with a movable door, where cables are employed to provide electric connection for electronics positioned at the door.

SUMMARY

In one or more embodiments, a cord connection assembly of a vehicle includes a wall, a door movable to and defining a space from the wall, and a receptacle received within the space and to detachably connect a plug with a cord. At least one of the wall and the door include a through-aperture to receive the cord such that first and second parts of the cord are positioned respectively inside and outside of the space when the plug is connected to the receptacle.

The through-aperture may be of an open loop in a plane view.

The cord connection assembly may further include a lip contacting an edge of the through-aperture, the lip being of a material different from a material of the door or the wall.

The receptacle may contact and be movable with the door.

The door may pivot about the wall via a connector.

The connector may be a pivot shaft contacting the receptacle and extending along a width direction.

Two spaced apart cross-sections of the connector taken along a direction transverse to the width direction may define there-between a void space.

Two ends of the door may translate to and from the wall via a linker.

The linker may include a push-push connector.

The wall may be part of an interior trim panel of the vehicle.

The receptacle may be rotatable about the door.

In another one or more embodiments, a vehicle interior trim assembly includes an interior trim panel, a door movable to and defining a space from the interior trim panel, and a receptacle received within the space and to detachably connect a plug with a cord. At least one of the interior trim panel and the door include a through-aperture to receive the cord such that first and second parts of the cord are positioned respectively inside and outside of the space when the plug is connected to the receptacle, the receptacle contacting and being movable with the door.

One or more advantageous features as described herein will be readily apparent from the following detailed description of one or more embodiments when considered in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION

Figure 1:
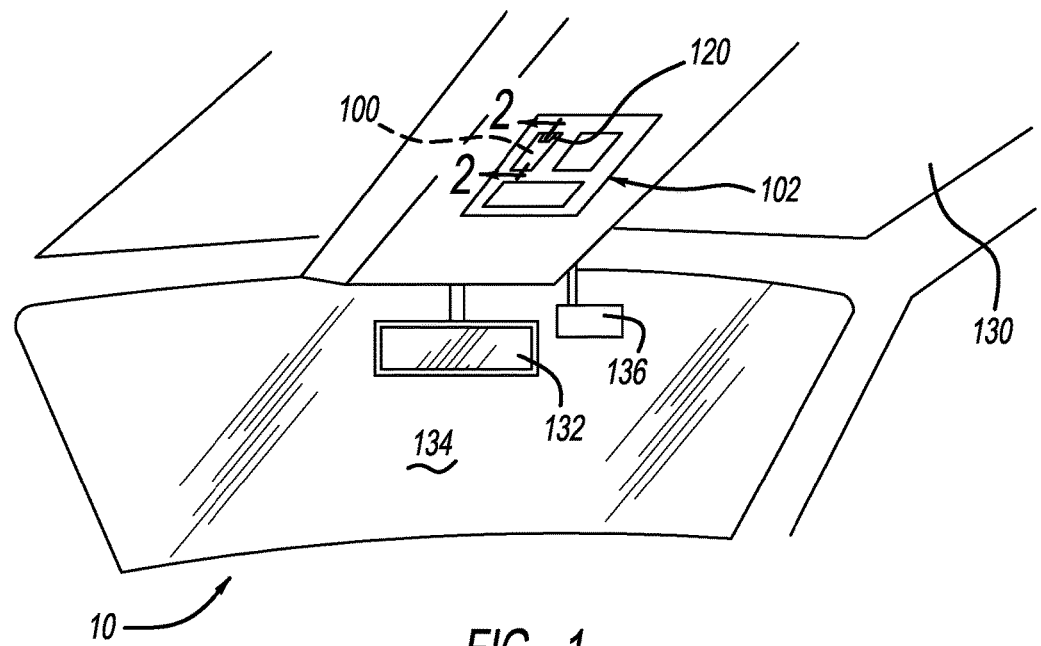
FIG. 1 illustratively depicts a perspective view of a cord connection assembly as positioned relative to a vehicle according to one or more embodiments of the present invention.

As referenced in the drawings, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

As detailed herein elsewhere, the present invention in one or more embodiments is believed to be advantageous in providing a favorable solution for the use of electronic devices, while keeping the vehicle interior clean and neat. In particular, a through-aperture is provided to at least one of the door and the wall of a cord assembly to avoid wires or cords from disturbing an occupant of the vehicle and also to avoid unwanted detachment of the plug from its receptacle while the electronic devices are in use.

Figure 2:
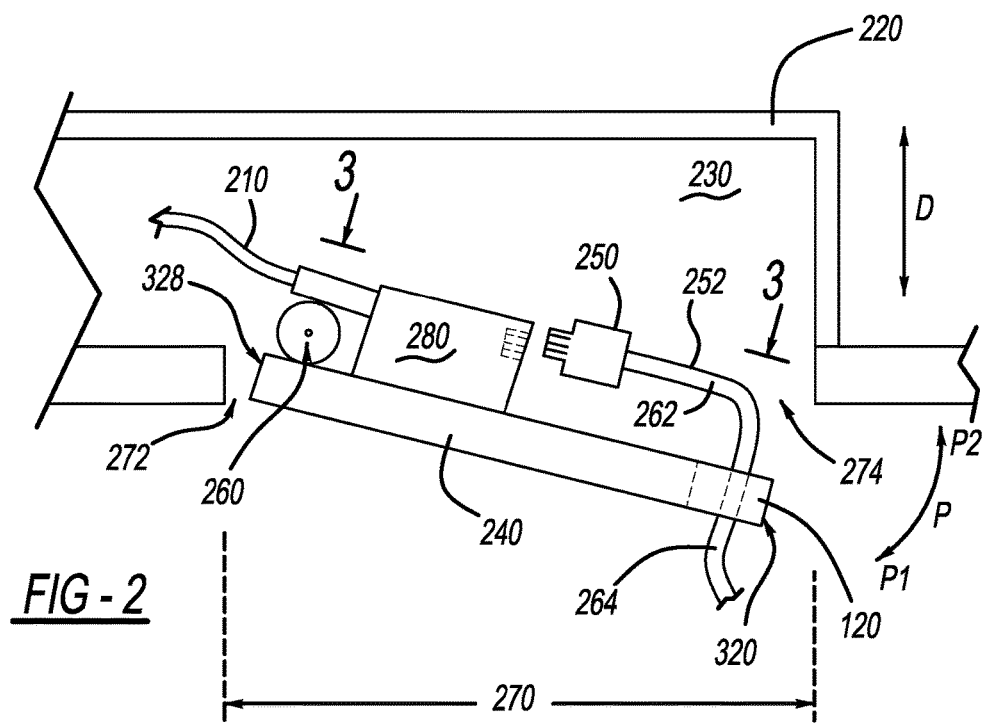
FIG. 2 illustratively depicts a cross-sectional view of the cord connection assembly as referenced in FIG. 1, taken along line "2-2"
Figure 3:
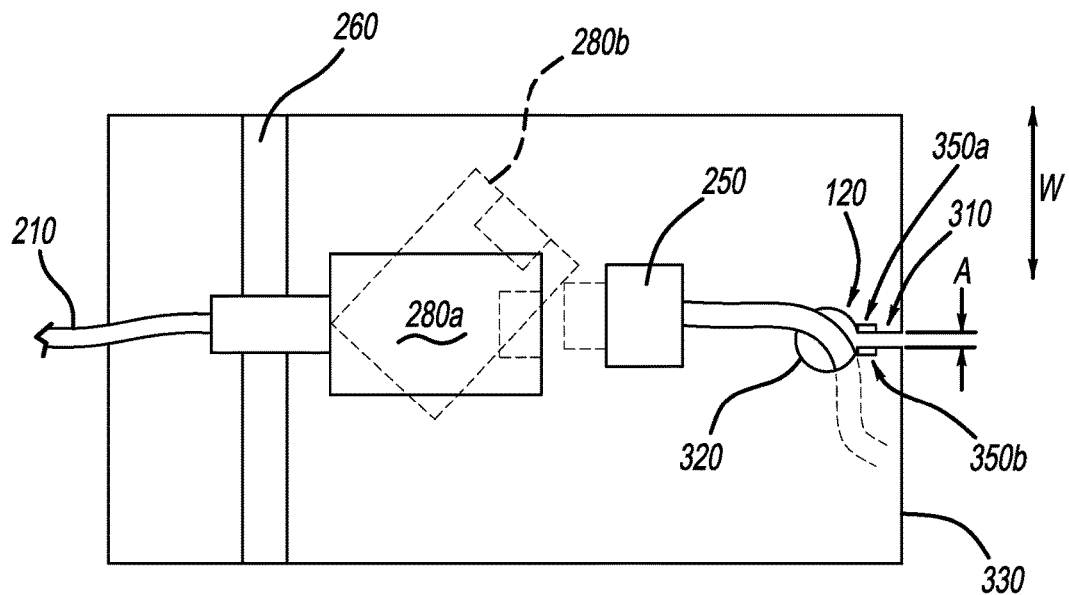
FIG. 3 illustratively depicts a top-down view of the cord connection assembly as referenced in FIG. 2, taken along line "3-3"

As illustratively depicted in FIG. 1 through FIG. 3, the present invention in one or more embodiments provides a cord connection assembly 100 of a vehicle in view of its non-limiting position relative to an overhead console 102 of a vehicle interior 10. The cord connection assembly 100 includes a wall 220, a door 240 movable to and defining a space 230 from the wall 220, a receptacle 280 received within the space 230 and to detachably connect a plug 250 with a cord 252, at least one of the wall 220 and the door 240 including a through-aperture 120 to receive the cord 252 such that first part 262 and second part 264 of the cord 252 are positioned respectively inside and outside of the space 230 when the plug 250 is connected to the receptacle 280. As illustratively depicted in FIG. 2, and as the door 240 moves along direction P from position P1 toward P2, the first part 262 of the cord 252 is positioned within the space 230 while the second part 264 is outside of the space 230. Alternatively this may be described as the first and second parts 262, 264 of the cord 252 positioned at opposite sides of the door 240 when the door 240 is at a closed position such as the position P2.

Referring back to FIG. 1, the front portion of the vehicle interior 10 may further include a windshield 134, a rear view mirror 132, an electronic device such as a global positioning system (GPS) device 136 installed by a user or a manufacturer, a roof 130, and an overhead console (OHC) 102 located at the roof 130. In this embodiment, the electronic device 136 is positioned near the OHC 102, which often needs to be electrically connected with the vehicle via a cord or cable to provide electricity or data transfer. The present invention is therefore providing the cord connection assembly 100 which may be located at the OHC 102 for connection with the electronic device 136. It is believed to be advantageous in providing electrical connection between the electronic device 136 and the cord connection assembly 100 where a relatively short cord or cable may be used for the connection without having to compromise on the aesthetic appeal of the vehicle interior and/or to interfere with the driver's view. For illustration purposes, the cord connection assembly 100 is depicted as being located at the OHC 102. In other embodiments, the cord connection assembly 100 may be located at other locations in the vehicle dependent upon particular requirements of the electronic device 136, such as other locations at the roof 130, a control panel, or a floor console. Further, the wall 220 of the cord connection assembly 100 may be a portion of the interior trim panel of the vehicle. In other words, the wall 220 may be formed integrally with the interior trim panel.

In one embodiment, and in view of FIG. 2, the wall 220 of the cord connection assembly 100 may be positioned at the OHC 102. Similarly, the door 240 of the cord connection assembly 100 may be positioned at the OHC 102. The door 240 is movable relative to the wall 220, and defines a space 230 from the wall 220. For instance, the wall 220 may include two or more sections connected with each other to at least partially form a housing of the cord connection assembly 100, defining the space 230 with an opening, with the opening to be at least partially covered by the door 240 and to enclose the space 230. For instance also, the wall 220 may include a single section to form one wall (such as a top wall) of the housing of the cord connection assembly 110, while the door 240 may include two or more sections to form other walls (such as a bottom wall and/or a side wall) of the housing. When the door 240 is to cover the opening, its lower surface may be aligned with the surrounding edge surface of the opening 270 defined between gaps 272, 274, or with the surface of the OHC 102, thus providing a better aesthetic appeal. For illustration purposes, gaps 272, 274 defined between the door 240 and its surrounding edge surfaces are depicted as enlarged in proportion, which may be minimized in actual use to provide enhanced appeal. When desirable, the lower surface of the door 240 may be protruding or in recess relative to the surrounding edge surface to increase or decrease the size of the space 230 of the cord connection assembly 100. Similarly, although being depicted as flat in the FIGs, the door 240 may take other regular or irregular shapes as needed, such as an arc, a hemisphere, or a box. As detailed herein elsewhere, the door 240 may be connected to the wall 220 via a connector 260, and may move relative to the wall 220 between an open position as depicted in FIG. 2, and the closed position as depicted in FIG. 1.

Further, a receptacle 280 is received within the space 230 and detachably connects a plug 250. When the cord 252 is connected to the electronic device 136 via the cord connection assembly 100, the plug 250 with the cord 252 may connect with the receptacle 280. When the cord connection assembly 100 is not being used, the plug 250 may be detached from the receptacle 280, and received together with the cord 252 in another location inside or outside of the vehicle. Although terms "plug" and "receptacle" are employed herein, it is to be appreciated that they do not necessarily correspond to male and female connectors, respectively. For instance, the plug may be a male connector while the receptacle may be a female connector; or the plug may be a female connector while the receptacle may be a male connector. In a non-limiting example, the receptacle 280 may be a well-known standard or micro USB interface to provide a common interface for a variety of electronic devices. Accordingly, various electronic devices may be connected to the cord connection assembly 100 via a USB cable to effect charging and/or one-way or two-way data transfer, without necessarily needing different connectors for different devices. In other non-limiting examples, other common or specific connectors such as AV connectors and HDMI connectors may also be utilized.

In one or more embodiments, the receptacle 280 may be rotatable relative to the door 240 and/or the through-aperture 120. As depicted in FIG. 3, and in a non-limiting example, the receptacle 280 may be rotatable from a position 280a (in solid line) to a position 280b (in dash line) to accommodate the plug 250 which may be in variable shapes and types, and/or to provide greater ease for operator's finger access. Moreover, another or more receptacles 280 may be positioned within the space 230 along a depth direction D and any one of these additional receptacles 280 may be rotatable in a fashion illustratively depicted in FIG. 3. Furthermore, another or more receptacles 280 may be positioned along direction W. The benefit of these alternative arrangements is to provide enhanced connection flexibility and versatility regarding various types of connectors.

Figure 4A:
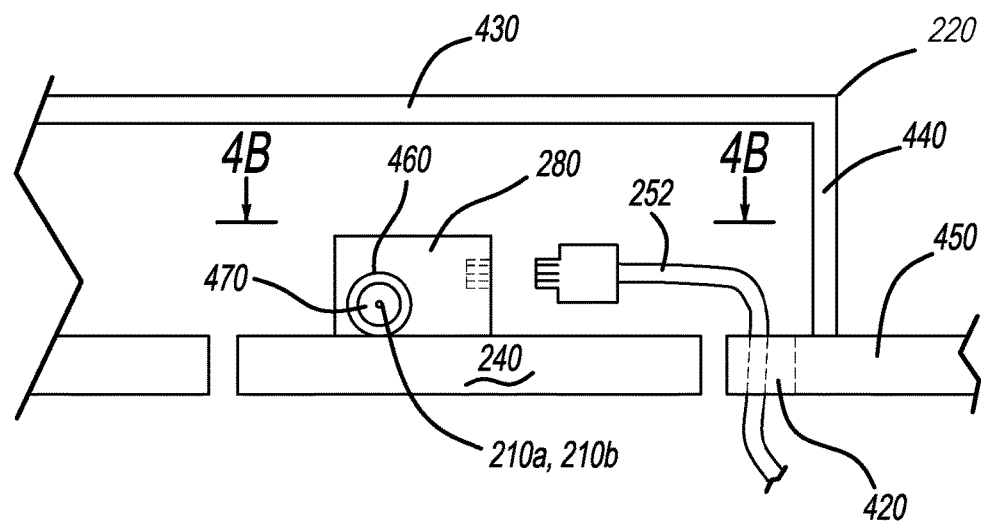
FIG. 4A illustratively depicts a cross-sectional view of an alternative of the cord connection assembly referenced in FIG. 1 and FIG. 2.
Figure 4B:
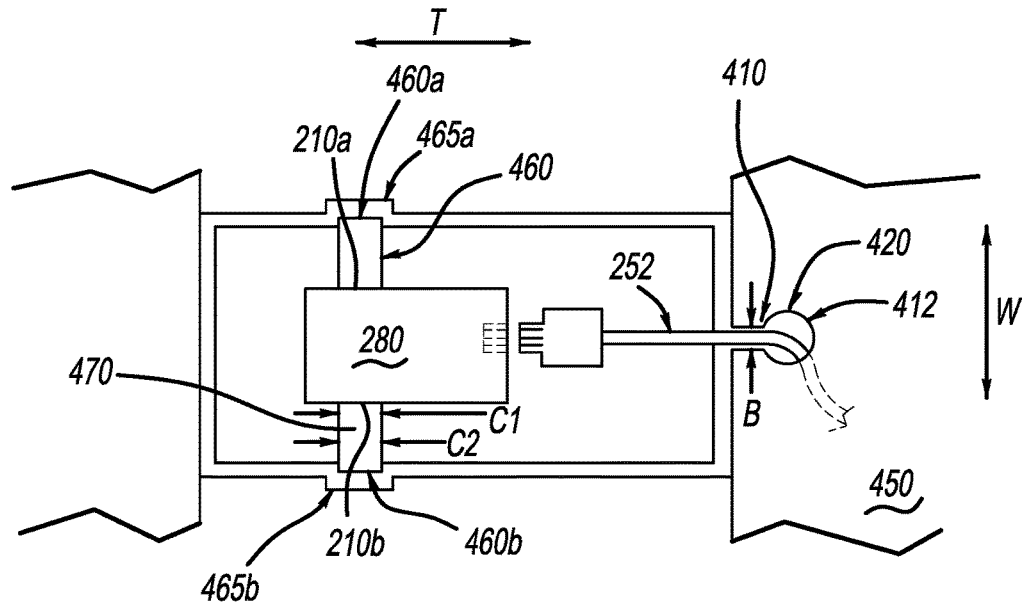
FIG. 4B illustratively depicts a top-down view of the cord connection assembly as referenced in FIG. 4A, taken along line "4B-4B"

Referring back to FIG. 4A and in view of FIG. 4B, a connector 460 may be hollow such that two spaced apart cross-sections C1 and C2 taken along a direction T transverse to the width direction W define there-between a void space 470 to accommodate and house therein structures such as the cable or cord 210a, 210b As detailed herein elsewhere, at least one of the door 240 and the wall 220 includes the through-aperture 120. In the embodiment depicted in FIG. 1 through FIG. 3, the through-aperture 120 is formed on the door 240, exposing at least part of the space 230. Accordingly, the cord 252 may extend through the through-aperture 120 and into the space 230 when the plug 250 is connected to the receptacle 280. In particular, the cord 252 may include the first part 262 and the second part 264. When connected, and as detailed herein elsewhere, the first portion 262 of the cord 252 may be positioned inside of the space 230, while the second portion 264 may be positioned outside of the space 230. With this structure, the door 240 may return to its closed position such as position P2 while maintaining the connection of the cord 252 when the plug 250 is connected to the receptacle 280. The plug 250 is not readily visible by an occupant of the vehicle because only the cord 252 is extending through the through-aperture 120 and the plug 250 which is relatively larger in size is hidden in the space 230 from the occupant, and therefore providing an improved aesthetical appeal. Further, and in certain instances, the through-aperture 120 may be of a relatively small size in comparison to the plug 250, and accordingly the plug 250 is not readily subject to unwanted detachment from the receptacle 280 even if the cord 252 is being pulled during use, providing a relatively more robust connection.

Referring back to FIG. 3, which illustratively depicts the door 240 formed with the through-aperture 120, the through-aperture 120 may be an open loop 320 with a slit 310. In other words, the door 280 may include a side wall 330, at which the slit 310 may be formed. In the plane view illustratively depicted in FIG. 3, the through-aperture 120 is depicted as the open loop 320 with the slit 310, and the loop 320 may be of any suitable size. The width "A" of the slit 310 may be smaller than the diameter or cross-sectional dimension of the cord 252, while the loop 320 may be larger in diameter than the cord 252. Accordingly, during use, the door 240 may be moved to the opening position such as position P1 relative to the wall 220 such that the cord 252 may move into the loop 320 via the slit 310. The cord 252 is not expected to detach easily from the loop 320 once having moved into the loop 320, since the width "A" of the slit 310 is smaller than the diameter of the cord 252. Also, the cord 252 may move freely in its longitudinal direction through the loop 320 because the loop 320 is larger in diameter than the cord 252, so as to facilitate a readily ascertainable connection of the plug 250 with the cord 252 to the receptacle 280.

In one or more embodiments, as illustratively depicted in FIG. 3, the cord connection assembly 100 may further include lips 350a, 350b to provide additional resistance such that the cord or cable 252 may be kept inside of the loop 320 after being forced its way therein. The lip 350a, 350b are shown in a pair; however, only one of the lips 350a, 350b may be employed. The lips 350a, 350b may be positioned to contact the loop 320 or the slit 310 or both. The lips 350a, 350b may differ in material than the door 240 and/or the wall 220. Non-limiting examples of the material for the lip 350a, 350b include soft polymers such as rubber and foam.

Now reference is made to FIG. 4A and FIG. 4B, which illustratively depict the cord connection assembly 100 of a vehicle according to another one or more embodiments. The wall 220 may include at least a top section 430, a side section 440, and a bottom section 450. The bottom section 450 may be aligned with the lower surface of the OHC 102 to provide a better aesthetic appeal. A through-aperture 420 is formed at the bottom section 450. Accordingly, when the door 240 is at the closed position, the cord 252 may extend through the through-aperture 420 at the bottom section 450, without having to be squeezed by the door 240, the wall 220, or in particular the bottom section 450 of the wall 220. As illustratively depicted in FIG. 4B, and similar to the through-aperture 120 referenced in FIG. 2 and FIG. 3, the through-aperture 420 may be formed as a loop 412 with a slit 410 at an edge of the bottom section 450. A width "B" of the slit 410 may be larger than the diameter or a cross-sectional dimension of the cord 252, such that the cord 252 may be readily received when the door 240 is at the closed position. When necessary, the through-aperture 420 formed at the wall 220 or its bottom section 450 may be of other shapes or structures.

In certain embodiments, the vehicle cord connection assembly 100 may include the through-aperture 120 positioned on the door 240 and the through-aperture 420 positioned on the wall 220, which may work together to retain the cord 252 when the door 240 is at the closed position. Alternatively a portion of the cord or cable 252 may be positioned through the door 240 via the through-aperture 120 and another portion of the cord or cable 252 may be positioned through the wall 220 via the through-aperture 420.

As detailed herein elsewhere, the door 240 may pivot about the wall 220 via the connector 260. In the embodiment illustratively depicted in FIG. 2, the connector 260 may be positioned at or on the door 240. The receptacle 280 may be secured to the door 240 to move together with the door 240. When the door 240 is at its open position, the receptacle 280 may be easily accessed by the occupant or become visible in the occupant's eye sight, as illustratively depicted in FIG. 2. Accordingly, the occupant may connect the plug 250 to the receptacle 280 with enhanced ease. Thereafter, the occupant may rotate the door 240 together with the receptacle 280 to its closed position, so that the receptacle 280 and the plug 250 may be hidden from the occupant's eye sight when the cord connection assembly 100 is in use, thus providing a well-organized vehicle interior.

To electrically connect the receptacle 280 to the vehicle electric system or data system, the cord connection assembly 100 may further include an output cord or cable 210. Referring back to FIG. 2, the output cable 210 may extend from the receptacle 280 and connect to another location of the vehicle. Accordingly, after the plug 250 is connected with the receptacle 280, the electronic device 136 may be connected to the vehicle electric system and receive charging, and/or be connected to the data system to effect data transfer in one-way or two-way.

Referring back again to FIG. 4A and FIG. 4B, and in another one or more embodiments, the connector 460 may contact the receptacle 280, and extend in the width direction "W" of the door 240. As illustratively depicted in the FIGs, the connector 460 may function as a pivot shaft, about which the receptacle 280 may rotate relative to the wall 220. The door 240 may also rotate relative to the wall 220 about the connector 460 when the door 240 is connected to the receptacle 280. In one or more embodiments, the wall 220 may be formed with a first recess 465a and a second recess 465b, which may receive a first end 460a and a second end 460b of the connector 460, respectively. Accordingly, and via a rotation of the first end 460a within the first recess 465a and a rotation of the second end 460b within the second recess 465b, the receptacle 280 and the door 240 may rotate relative to the wall 220. In other embodiments not shown in the FIGs, the connector 460 may be secured to the wall 220, and the receptacle 280 may be formed with a recess to match an end of the connector 460. Thus, the receptacle 280 and the door 240 may rotate relative to the wall 220 in a similar way as described herein above.

As detailed herein elsewhere, and in one embodiment, the connector 460 may be a hollow structure, such that the output cable 210 may extend out from the receptacle 280 through the connector 460 and the wall 220, and be connected to the vehicle electric system or data system. Accordingly unwanted bending of the output cord 210a, 210b due to repeated opening and closing of the door 240 may be avoided.

Figure 5:
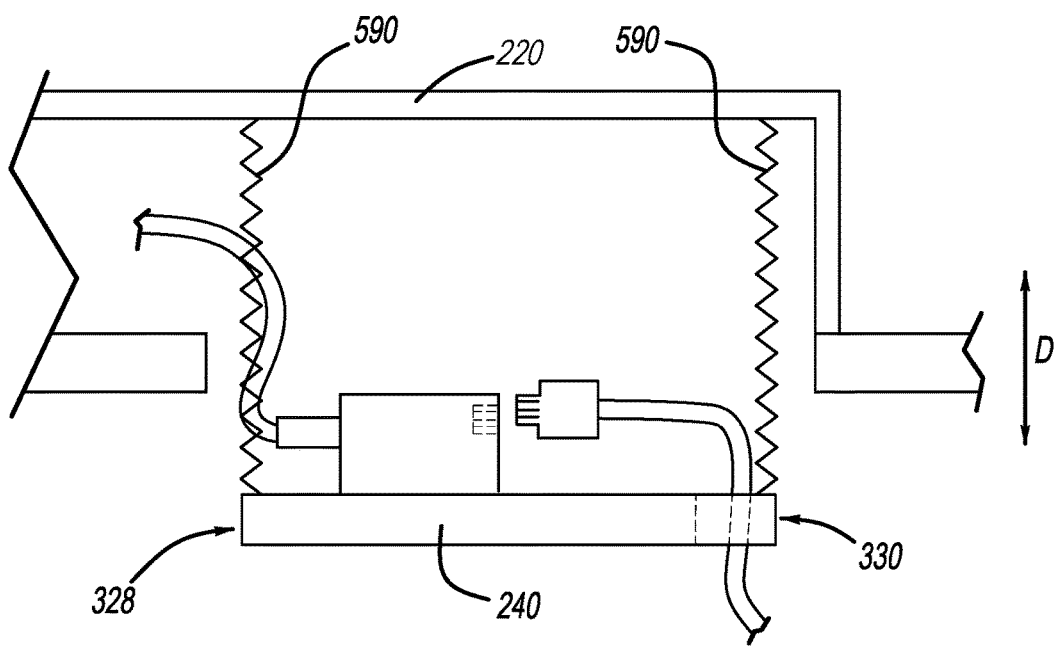
FIG. 5 illustratively depicts another alternative of the cord connection assembly referenced in FIG. 1 and FIG. 2.

In one or more embodiments of the present invention, and in view of FIG. 5, the door 240 may translate relative to the wall 220 via a linker 590, and opposed ends or edges 328, 330 of the door 240 may together translate to and from the wall 220 along the depth direction "D". In particular, one or more linkers 590 may be connected between the door 240 and the top of the wall 220, optionally in a common push-push lock structure. Accordingly, the occupant may push the door 240 to release the lock, enabling the door 240 to translate downwardly away from the wall 220 so as to expose the receptacle 280. After connection of the plug 250 to the receptacle 280 is completed, the door 240 may be translated upwardly, and the door 240 may be pushed to be locked with the wall 220. In other embodiments, the linker may be implemented as a track unit (not shown) between the door 240 and the wall 220, thereby assisting the movement of the door 240. This configuration is believed to provide a beneficial mechanism by which operational access may be gained at both ends of the door 240, such as the opposing ends 328, 330.

In one or more embodiments, the present invention provides a cord connection assembly of a vehicle. One skilled in the art will readily recognize from such discussion, and from the accompanying drawings and claims that various changes, modifications and variations can be made therein without departing from the true spirit and fair scope of the invention as defined by the following claims.

What is claimed is:

1. A cord connection assembly of a vehicle, comprising:
   a wall;
   a door movable to and defining a space from the wall;
   a receptacle received within the space and to detachably connect a plug with a cord, at least one of the wall and the door including a through-aperture to receive the cord such that first and second parts of the cord are positioned at opposite sides of the door when the door is closed; and
   a lip contacting an edge of the through-aperture.

2. The cord connection assembly of claim 1, wherein the through-aperture is of an open loop in a plane view.

3. The cord connection assembly of claim 2, wherein the lip differing in material than the door or the wall.

4. The cord connection assembly of claim 1, wherein the receptacle contacts and is movable with the door.

5. The cord connection assembly of claim 1, wherein the door pivots about the wall via a connector.

6. The cord connection assembly of claim 5, wherein the connector is a pivot shaft contacting the receptacle and extending along a width direction.

7. The cord connection assembly of claim 5, wherein two spaced apart cross-sections of the connector taken along a direction transverse to the width direction define therebetween a void space.

8. The cord connection assembly of claim 1, wherein two ends of the door translate to and from the wall via a linker.

9. The cord connection assembly of claim 8, wherein the linker includes a push-push connector.

10. The cord connection assembly of claim 1, wherein the wall is part of an interior trim panel of the vehicle.

11. The cord connection assembly of claim 1, wherein the receptacle is rotatable relative to the door.

12. A vehicle interior trim assembly, comprising:
    an interior trim panel;
    a door movable to and defining a space from the interior trim panel;
    a receptacle received within the space and to detachably connect a plug with a cord, at least one of the interior trim panel and the door including a through-aperture to receive the cord such that first and second parts of the cord are positioned respectively inside and outside of the space when the plug is connected to the receptacle, the receptacle contacting and being movable with the door, wherein the through-aperture is of an open loop in a plane view.

13. The vehicle interior trim assembly of claim 12, wherein the door pivots about the wall via a connector.

14. The vehicle interior trim assembly of claim 12, wherein two ends of the door translate to and from the wall via a linker.

15. The cord connection assembly of claim 12, wherein the receptacle is rotatable about the door.

* * * * *